(No Model.)
A. J. L. LORETZ.
WATER REGULATOR AND ACCUMULATOR FOR HOUSE PURPOSES.
No. 407,830. Patented July 30, 1889.
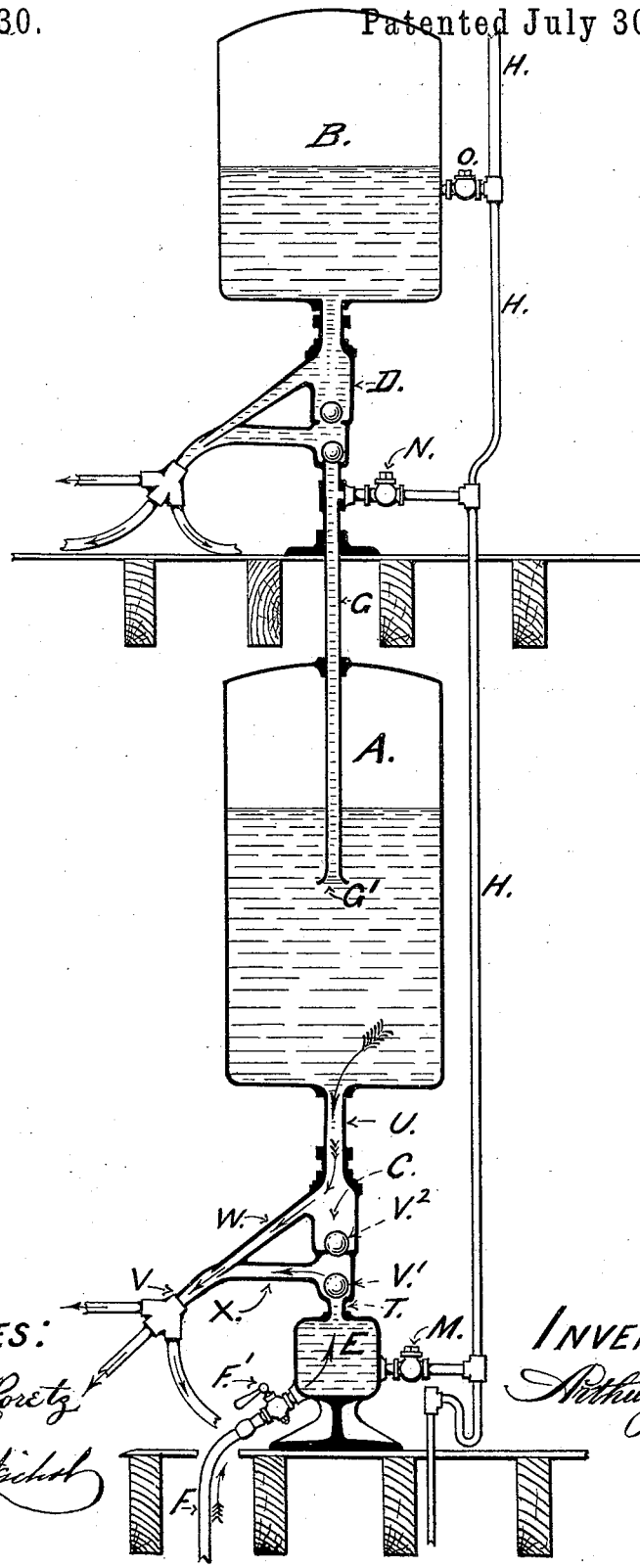
WITNESSES:
INVENTOR.

UNITED STATES PATENT OFFICE.

ARTHUR J. L. LORETZ, OF BROOKLYN, NEW YORK.

WATER REGULATOR AND ACCUMULATOR FOR HOUSE PURPOSES.

SPECIFICATION forming part of Letters Patent No. 407,830, dated July 30, 1889.

Application filed September 19, 1887. Serial No. 250,088. (No model.)

*To all whom it may concern:*

Be it known that I, ARTHUR J. L. LORETZ, of Brooklyn, in the county of Kings and State of New York, have invented a Water Regulator and Accumulator for House Purposes, of which the following is a specification.

My invention has in view the production of an apparatus for regulating the water-supply in buildings that are supplied from streep-taps of water-mains, so as to furnish to a reasonable extent a constant supply of water on each floor, whether the supply be drawn upon by tenants on lower floors or not. Furthermore, the same device neutralizes the variable and destructive strains on the pipes caused by the sudden and harsh motions of the water therein due to the sudden closing of faucets and valves, and, furthermore, accumulates the force which would otherwise cause these destructive effects to produce powerful currents for closet and fire purposes. In addition to the above advantages the water is thoroughly aerated, compressed air being forced through it.

The peculiarity of my present improvement consists more particularly in the regulator and the device combined therewith for aerating thoroughly the water, and thereby continually keeping up a fresh supply of compressed air in the accumulator—a great difficulty heretofore experienced in this class of apparatuses, due to the absorption of the air by the water, metal surfaces of tank or accumulator, and loss by leakages. Furthermore, the compressed air at intervals produces an equilibrium in two accumulators placed one above the other, thereby increasing the water-pressure in the higher one almost to the extent of that in the lower one.

The drawing represents the regulators and accumulators as applied to a three-story dwelling, the second and third stories being the floors where the supply is generally deficient on account of its general use in the basement and on the first floor.

A is the accumulator on the second floor, and B is the one on the third floor. C and D are their respective regulators.

E is the main air-feeder for the whole arrangement.

F is the main supply-pipe, through which the water-supply reaches the second floor after supplying the floors below direct from the street-main tap.

G is the connecting-pipe between the two accumulators of the second and third floors, and H is the fresh-air pipe, leading to the accumulators and air-feeder from an elevated portion of the roof of the building and located away from the ventilators, flues, and sewer-vents discharging impure gases, and supplies fresh air to the feeder E through air-valve M, and also supplies accumulators A and B through air-valves N and O.

The regulators C and D are alike, and consist of a cast-brass valve-chest with three nozzles T U V and containing two rubber ball-valves $V'$ and $V^2$, the lower valve $V'$ acting as a check-valve for the accumulators, while the upper one $V^2$ regulates the various motions of the water-current, as will be hereinafter explained.

T is the lower nozzle, which admits the supply. The top nozzle U connects invariably with the accumulators, while V is the delivery-nozzle, receiving its supply from two branches W and X, and to which the pipes supplying that particular floor are attached.

The operation of the apparatus is as follows: Stop-cock $F'$ being opened, the water will enter by way of supply-pipe F into chamber E, driving the air therein ahead of it, and, entering the lower nozzle T of the regulator C, lifts up the two ball-valves $V'$ and $V^2$; then passes up through nozzle U into the accumulator A, driving the compressed air into the top of same and through connecting-pipe G, and then passing through a similar regulator D into the accumulator B until the water reaches the mouth $G'$ of the connecting-pipe G, when the air in the upper part of the accumulator A will be trapped and gradually compressed therein by the incoming water under pressure, while another portion of the supply-water will rise in the pipe G, pass the valves in the governor or regulator D, and enter the accumulator B, compressing therein the air that had previously entered. This compressing of air and filling with water will continue in the two accumulators until the resisting pressure of the compressed air will become equal to that of the water in the street-main, less the pressure caused by the height of the column of water due to the relative heights of the two accumulators above said water-main. Supposing, now, that water be drawn on floors below the accumulator, thereby shutting off the supply at F, the lower valve V' of the regulator C will act as a check for the entire water-supply in the accumulators, while the water in chamber E will recede therefrom, owing to the air being admitted therein by valve M and assisting to the extent of its capacity the supply below. Water being now shut off below, the supply will fly again up F and into E, which is now filled with air, and reduce the force of the blow or water ram by the gradual compression of the air until it equals again that in the accumulators, when the valves will be lifted and the new charge of air to the extent of the capacity of E will be admitted into the accumulator A, passing through its supply of water, and, after aerating it, trap itself in the upper part thereof. Now, should this operation be often repeated by a free use of the water-supply in the lower floors, the compressed air will increase in the top of accumulator A and drive the water through G' up into accumulator B until the air in A reaches to the mouth G' of the pipe G, when air will pass up into B with a pressure due to that existing in A, and replenishing the air in its upper part, which became reduced in volume by leakages and other causes, and also increasing the pressure upon the water therein by a partial equilibrium having taken place between the two compressed-air spaces. Such is the supplying process for the two accumulators when the same have not their supplies individually or collectively drawn upon. Now, should water be drawn at V by the opening of any of the valves or faucets on the second floor which this outlet supplies, the compressed air, with its accumulated and elastic pressure in A, will force the water therein out by way of U and W with such a force as to carry with its current that of the supply F by way of E T, through valve V', and by way of X, the two currents combining at V, the two opposite-moving currents from the direction T and U being separated and led to their respective channels X and W by the automatic seating action of valve $V^2$, which forms a gate between the opposite-moving currents at that point and admits of them being combined into one powerful stream at V for fire or closet purposes, the pressure of the upper accumulator during the above operation being retained by the lower valve in the regulator D. Should water at the same time also be drawn on the floors below, withdrawing for the time the supply from F, the lower valve V' of the regulator C will retain the pressure in the accumulator A, and the supply at V will be ample and powerful, due to the compressed air exerting its elastic force on the water.

The operation of the upper regulator D and accumulator B is similar to the lower one C and A, the supply in A being then considered the same as the main supply from F.

Should the supply in both accumulators be heavily drawn upon, the air-valves N and O will open and admit fresh air for replenishment independent of the air-feeder E, and allow the water therein to be entirely drawn off, if desired.

Having explained my invention, what I claim, and desire to secure by Letters Patent, is—

1. In combination with a supply-pipe F and accumulators A and B, provided with their respective regulators C and D, and connecting-pipe G, a chamber E, provided with valve M, inlet for pipe F, and outlet at T, substantially as and for the purpose herein set forth.

2. In combination with accumulators A and B, provided with regulators C and D, and chamber E, valves M N O, and fresh-air pipe H, substantially as and for the purpose described.

ARTHUR J. L. LORETZ.

Witnesses:
CHARLES F. LORETZ,
WALTER NICHOL.